United States Patent [19]

Osborne, Sr.

[11] Patent Number: 4,965,704
[45] Date of Patent: Oct. 23, 1990

[54] RUNNING BOARD LIGHT

[75] Inventor: David B. Osborne, Sr., Elkhart, Ind.

[73] Assignee: Continental Accessories, Inc., Sturgis, Mich.

[21] Appl. No.: 364,709

[22] Filed: Jun. 9, 1989

[51] Int. Cl.⁵ .......................... B60Q 1/24; F21V 21/00
[52] U.S. Cl. ...................................... 362/81; 362/249
[58] Field of Search .................. 362/61, 81, 267, 329, 362/368, 375, 240, 249

[56] References Cited

U.S. PATENT DOCUMENTS

| | | | |
|---|---|---|---|
| 2,081,899 | 6/1937 | Bridge | 362/81 |
| 3,939,337 | 2/1976 | Oda et al. | 362/267 |
| 4,380,793 | 4/1983 | Potts | 362/267 |
| 4,544,991 | 10/1985 | Gorsuch | 362/81 |
| 4,617,617 | 10/1986 | Cunningham et al. | 362/267 |
| 4,819,136 | 4/1989 | Ramsey | 362/81 |

Primary Examiner—Ira S. Lazarus
Assistant Examiner—Peggy Neils
Attorney, Agent, or Firm—Flynn, Thiel, Boutell & Tanis

[57] ABSTRACT

A light assembly having a housing and an opening into an interior recess in the housing and a cover for covering the opening into the recess. The bottom wall of the recess has a lens construction integrally formed therein, such as by making the housing, particularly the bottom wall thereof, transparent to light. The inside wall surface of the cover has a U-shaped reflector mounted thereon, which U-shaped reflector has plural light bulbs spaced along the length thereof. The U-shaped reflector opens outwardly in a direction so as to face the transparent portion of the bottom wall of the recess. A labyrinth seal formed solely by the material of the housing and the material of the cover encircles the opening into the recess so as to make it unnecessary to provide a separate seal or gasket-like member.

4 Claims, 2 Drawing Sheets

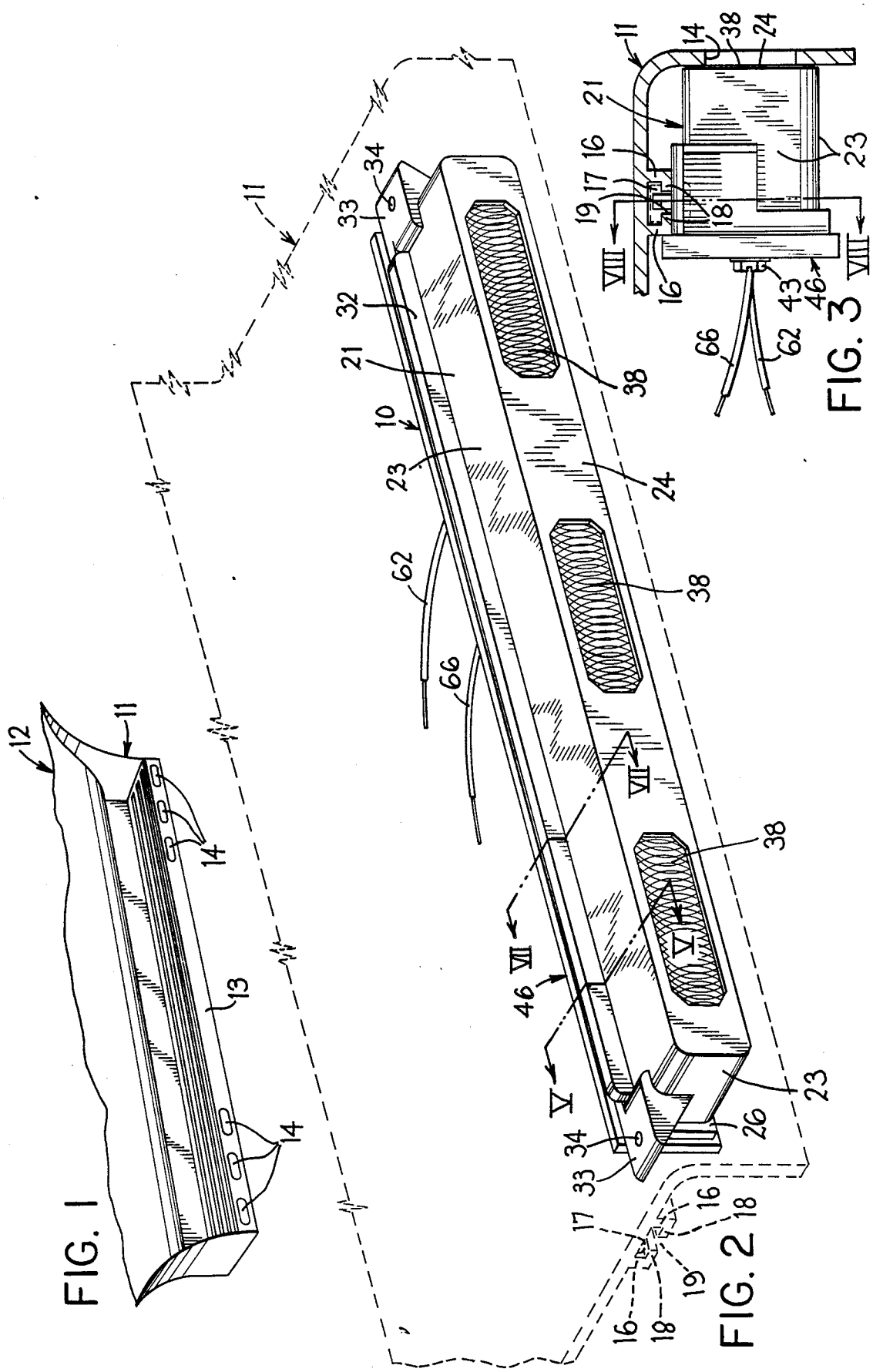

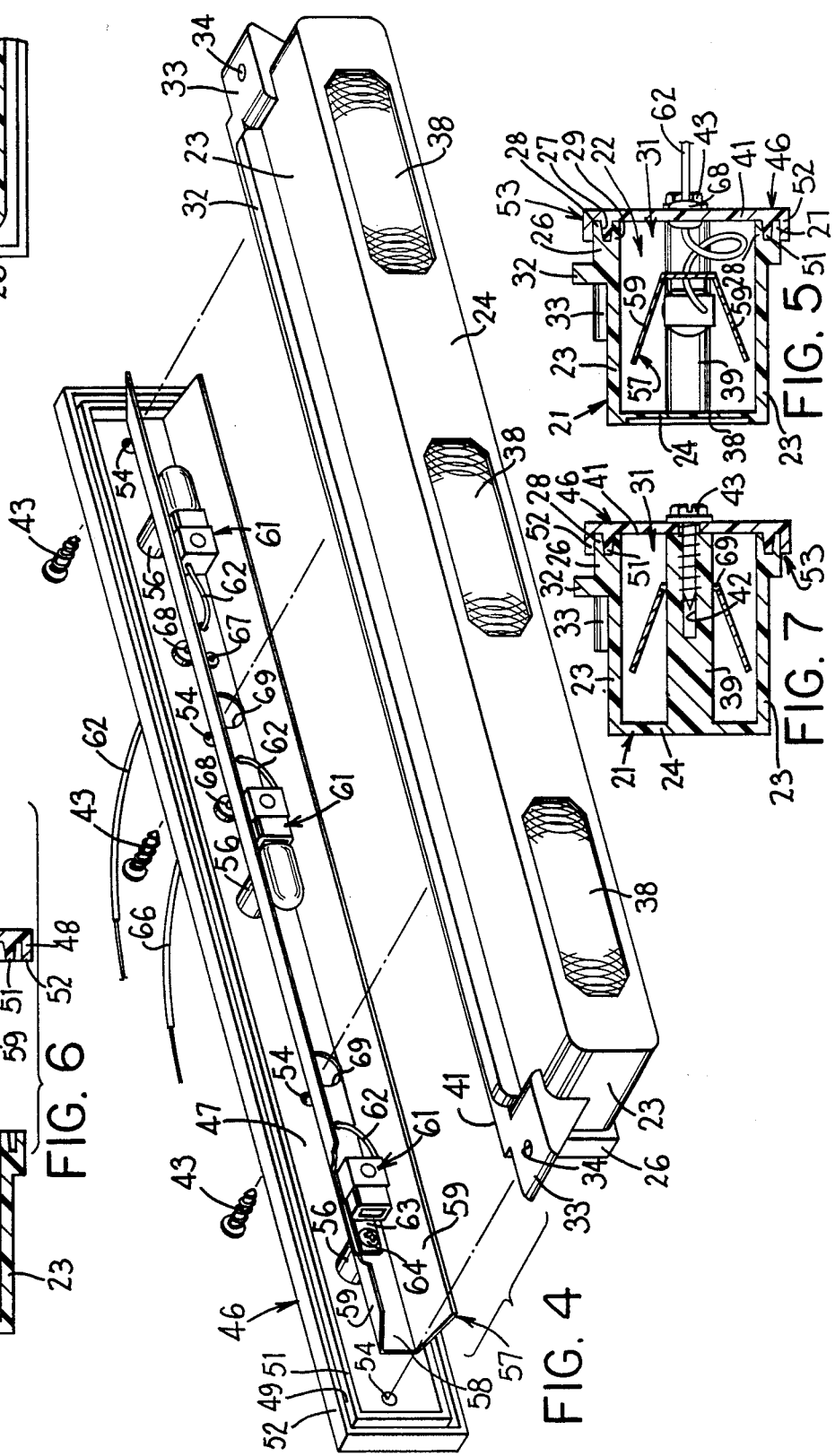

RUNNING BOARD LIGHT

FIELD OF THE INVENTION

This invention relates to a light assembly and, more particularly, relates to a light assembly for use on running boards of vehicles, particularly, trucks and vans, which light assembly has a housing structure adapted to be fixed to the vehicle and a removable lid for allowing quick access to the internal light bulb for purposes of facilitating a changing of same without necessitating a removal of the housing structure from the vehicle.

BACKGROUND OF THE INVENTION

The placement of small lights on an exterior surface of a vehicle, such as on the edge of a running board of a vehicle is considered decorative by many truck and van owners. However, when a light bulb fails within the light assembly used on a running board, inadequate provision has been previously provided for allowing access to the interior of the light assembly to facilitate a changing of the light bulb. In all light assemblages of which I am aware, it is necessary to remove the entire light assembly from beneath the running board so that access to the appropriate fasteners is facilitated to permit removal of a transparent lens cover to gain access to the light bulb. In many instances, the fastening structure which holds the light assembly to the underside of the running board is rusted and cannot easily be removed. As a result, the simple task of changing a light bulb becomes a major operation due to the inability of gaining access to the interior of the light assembly Thus, the provision of a light assembly which will facilitate easy access to the interior for facilitating a quick change of a light bulb is deemed highly desirable.

Accordingly, the objects or the present invention include:

1. The provision of a light assembly which can be fastened by fastening structure to the underside of a running board, which fastening structure need never be removed in order to gain access to the interior of the light assembly for purposes of exchanging light bulbs.
2. To provide a light assembly, as aforesaid, wherein a removable cover is provided, the removal of which facilitates access to the interior of the light assembly, which cover is removable from the light assembly without necessitating removal of the entire light assembly from the running board or the like.
3. To provide a light assembly, as aforesaid, wherein the body of the light housing is made of a transparent moldable plastic material so that the bottom wall of the housing is transparent thereby allowing the bottom of the light housing to be placed flush against the inside edge of a step on a running board or the like, which edge has openings therein aligned with the light bulbs inside the light housing.
4. To provide a light assembly, as aforesaid, wherein structure is provided around the opening into the recess in the light housing as well as structure around the perimeter of the cover to facilitate a sealed connection of the cover to the housing without necessitating the use of a separate seal or gasket member.
5. To provide a light assembly, as aforesaid, which is made of a durable moldable plastic material which will withstand the normal abuse applied thereto while mounted on a vehicle.

SUMMARY OF THE INVENTION

The objects and purposes of the broadest aspect of the invention, including those set forth above, are met by proViding a light assembly which includes an elongated unitary housing made of a plastic material, which housing has an elongate recess therein with side walls and a bottom wall. An opening into the recess is provided on a side remote from the bottom wall. At least the bottom wall of the housing is transparent to rays of light. A cover receiving structure is provided on the housing and encircles the opening into the recess. A cover is also provided and has a rim structure thereon encircling the cover adjacent the perimeter. The rim structure is adapted to be coupled to the cover receiving structure to effect a sealing connection of the cover to the housing. An elongated reflector, generally U-shaped in cross section, is mounted on the cover, the U-shape of the reflector opening in a direction facing away from the cover. A plurality of light bulbs are mounted on the reflector. Fastening structure is operatively connected to the cover and to a fastener receiving structure provided on the housing for effecting a securing of the cover to the housing with the reflector and light bulbs being received in the recess. The U-shape of the reflector opens in a direction toward the transparent bottom wall of the recess so that light caused by an illumination of the light bulbs will be caused to pass through the transparent bottom wall.

BRIEF DESCRIPTION OF THE DRAWINGS

The subject matter of the invention will be described in more detail hereinafter in connection with the exemplary embodiments illustrated in the drawings, in which:

FIG. 1 is a fragmentary perspective view of a running board on a vehicle;

FIG. 2 is a perspective view of a light assembly embodying the invention, which light assembly is shown in juxtaposition to a running board shown in broken lines;

FIG. 3 is a left end view of the light assembly illustrated in FIG. 2;

FIG. 4 is an exploded perspective view of the light assembly illustrated in FIG. 2;

FIG. 5 is a sectional view taken along the line V—V in FIG. 2;

FIG. 6 is an exploded sectional view, namely, a view illustrating a removal of the cover and reflector from within the light housing, FIG. 7 is a sectional view taken along the line VII—VII of FIG. 2; and FIG. 8 is a sectional view taken along the line VIII—VIII of FIG. 3.

Certain terminology is used in the following description for convenience in reference only and is not to be considered limiting. For example, the words "up", "down", "front" and "rear" will designate directions in the drawings to which reference is made. The words "in" and "out" will respectively refer to directions toward and away from the geometric center of the light assembly and designated parts thereof. Such terminology will include the words specifically mentioned above, derivatives thereof and words of similar import.

DETAILED DESCRIPTION

While a running board was the specific environment in which I intended to use my light assembly, other environments also exist for which my light assembly would be suitable. For example, my light assembly could be located to illuminate the upwardly facing surface of steps. Nevertheless, the following discussion will pertain to a use of the light assembly on a vehicle running board.

FIG. 1 illustrates an environment in which the light assembly 10 was designed to be used. That is, FIG. 1 illustrates a running board assembly on a vehicle 12. The running board 11 has a downwardly extending front edge 13 in which is provided a plurality of cutouts or openings 14. FIG. 3 illustrates a cross section of the front edge of the running board 11 and more clearly depicts the provision of a pair of parallel and downwardly extending ribs 16 which define a channel 17 therebetween. The lower edges of the ribs 16 have inwardly turned flanges 18 which are spaced a finite distance away from one another so as to define a gap 19 therebetween.

The light assembly 10 includes an elongated housing 21 oriented to extend generally parallel to the aforementioned channel 17 on the underside of the running board 11. The housing includes a recess 22 (FIG. 5) therein, which recess is defined by plural side walls 23 and a bottom wall 24. The edge of the side walls 23 remote from the bottom wall 24 define an opening 25 into the recess 22. The edge also has a cover receiving edge 26 consisting of a U-shaped channel 27 defined by a pair of generally parallel wall sections 28 and 29. The U-shaped channel 27 opens outwardly and faces in the same direction as an opening 25 into the recess 22. More specifically, the cover receiving edge 26 encircles the opening 25 as illustrated in FIGS. 5-7. To accommodate the cover receiving edge structure, the wall thickness of the cover receiving edge 26 is generally thicker than the wall thickness of the side walls 23.

At least one of the lower side walls 23 has an elongated rib 32 upstanding thereon and in juxtaposition to the cover receiving edge 26. The rib 32 is of a sufficient thickness from front to rear (corresponds to right to left in FIGS. 5-7) so as to facilitate it being snugly received in the gap 19 on the underside of a running board 11. A flange 33 extends in the longitudinal direction from each end of the elongated housing 21. Each flange 33 has a hole 34 extending therethrough, the axes of both openings 34 being generally coplanar and aligned with a plane passing centrally through the length of the upstanding rib 32. In other words, when the rib 32 is received in the gap 19, the holes 34 will be aligned with the gap 19. As is illustrated in FIG. 8, a nut 36 having an internally threaded hole therethrough is slidably received in the channel 17 provided on the underside of the running board 11. A screw fastener 37 is inserted into the hole 34 in the flange 33 and threadedly coupled to the nut 36 to facilitate a securement of the housing 21 to the underside of the running board 11.

In this particular embodiment, the bottom wall 24 of the housing 21 has a plurality of regions 38 where the wall thickness of the material utilized for the housing 21 is thinner than the remaining portions of the bottom wall. The regions 38 are integral with the material of the bottom wall and are of sufficient thinness so as to be transparent to rays of light. Thus, I do not need to be concerned about moisture entering the recess 22 through the lens construction defined by the regions 38. Further, and in this particular embodiment, the lens construction defined by the regions 38 are aligned with the plural openings 14 formed in the front edge 13 of the running board 11 as illustrated in FIG. 1.

A plurality of posts 39 are spaced along the length of the recess 22 in the housing 21. The posts 39 are integrally formed on the bottom wall 24 between the lens portions defined by the regions 38. The posts 39 each terminate at the end remote from the bottom wall 24 flush with the front facing edge 41 of the cover receiving edge 26. The end of each post 39 remote from the bottom wall 24 has an opening 42 therein adapted to receive a screw fastener therein, such as the screw fastener 43 illustrated in FIGS. 4, 6 and 7.

A cover 46 is provided for covering the opening 25 into the recess 22. The cover 46 has a generally planar wall 47 surrounded by a rim structure 48 which is thicker than the wall thickness of the wall 47 as best illustrated in FIG. 6. The rim structure 48 has a channel 49 therein which extends around the entire perimeter of the cover 46 and opens in a direction toward the housing 21 as illustrated in FIG. 6. The channel 49 is defined by parallel wall sections 51 and 52. In this particular embodiment, the rim structure 48 has been adapted to operatively couple to the cover receiving edge 26 in such a manner as to define a labyrinth seal 53. That is, the wall section 51 of the rim structure 48 on the cover 46 is adapted to be received into the channel 27 on the housing 21. Conversely, the wall section 28 of the cover receiving edge 26 is received in the channel 49 of the rim structure 48 of the cover 46. Thus, I have been able to provide a very effective seal to prevent moisture and the like from entering the recess 22, all without the specific use of a separate seal or gasket member.

A plurality of holes 54 are provided through the wall 47 of the cover 46. These holes 54 are aligned with the openings 42 in the posts 39 provided in the recess 22 of the housing 21.

A plurality of upstanding posts 56 are provided on the wall 47 on a side of the cover 46 which faces the opening 25 into the recess 22 of the housing 21. In this particular embodiment, the material of the posts 56 is integral with the material of the cover 46. Further, and in this particular embodiment, the posts 56 are each located between a pair of holes 54. An elongated and U-shaped reflector 57 is fastened to the end of each of the posts 56 which is remote from the wall 47. More specifically, the U-shaped reflector has a bottom wall 58 fastened to the posts 56 and a pair of diverging walls 59 extending away from opposite longitudinal edges of the bottom wall 58.

A plurality of light bulb assemblies 61 is provided between the walls 59 of the U-shaped reflector 57. Each light bulb assembly 61 has a wire 62 operatively connected to the filament of the light bulb. The chassis of the light bulb assembly has a tab 63 adapted to become electrically connected to the shell of the light bulb. The tab 63 rests on the bottom wall 58 of the U-shaped reflector 57 and a screw fastener 64 is utilized for securing not only the tab 63 of the light assembly 61 but also the U-shaped reflector 57 to the post 56. The light bulb in the left most light bulb assembly illustrated in FIG. 4 has been removed to facilitate an illustration of the screw fastener 64 and tab 63. As is illustrated in FIG. 4, each of the wires 62 coupled to the light bulb assemblies 61 are served by a common conductor also numbered 62.

The U-shaped reflector is made of a metallic material and is, therefore, electrically conductive. The ground for each light bulb assembly 61 is facilitated through the tab 63 and the material of the U-shaped reflector 57 which is in turn connected to a wire 66 by a rivet 67. The wires 62 and 66 pass through appropriate openings in the wall 47 of the cover 46 and a grommet 68 serves to provide a sufficient seal around the outer diameter of the wires 62 and 66 so as to prevent moisture from entering the recess 22.

A plurality of enlarged holes 69 are provided in the bottom wall 58 of the U-shaped reflector 57, which holes 69 are axially aligned with the holes 54 in the cover 46 as well as with the posts 39 and the holes 42 in the posts 39 provided in the recess 22 of the housing 21. The holes 69 are of a sufficient diameter to encircle the posts 39 as illustrated in FIG. 7. The holes 54 at the lateral ends of the cover 46 and the correspondingly axially aligned posts 39 at the longitudinal ends of the recess 22 are oriented beyond the longitudinal length of the U-shaped reflector 57 and, therefore, corresponding holes in the bottom wall of the U-shaped reflector are not required.

Once the cover 46 has been fitted onto the housing 21, the ends of each of the posts 39 will be virtually touching the inside surface of the wall 47 of the cover 46. Further, the holes 42 in the posts 39 will readily accept, through the immediately adjacent holes 54 in the wall 47, the screw fasteners 43 therein so as to facilitate a fastening of the cover 46 to the housing 21.

As is illustrated in FIG. 5, the U-shaped reflector 57 and, particularly, its diverging walls 59, provide a channel which opens outwardly in a direction facing the lens construction defined by the regions 38 on the bottom wall 24. Further, and as stated above, the light bulb assemblies 61 are oriented on the U-shaped reflector 57 so as to be in alignment with the lens construction defined by the thin wall regions 38 of the bottom wall 24. When a light bulb of a given light bulb assembly 61 burns out and replacement thereof is desired, all that needs to be accomplished is a removal of the screw fasteners 43 followed by a removal of the cover 46 which carries with it the U-shaped reflector 57 and the light bulb assemblies 61 fastened thereto. The housing 21 remains fastened to the running board 11. Since the material of both the cover 46 and the housing 21 are made of a moldable plastic material, the screw fasteners 43 will, upon tightening, deform the plastic slightly so as to prevent moisture from seeping therepast. As a result, and while the exterior surface of the heads of the screw fasteners 43 may rust after time, the threads thereon sealed within the holes 42 will not rust and removal of the screw fasteners will not prove to be difficult at all. On the other hand, the screw fasteners 37 coupled to the nuts 36 holding the housing 21 onto the running board 11 Will be both rusted and removal thereof will be extremely difficult. However, and as stated above, removal of the screw fasteners 37 from their engagement with the nuts 36 is not necessary in this particular construction. Further, and since the cover does not nave a separate seal or gasket member for facilitating a seal between the cover 46 and the housing 21, no concern need be given to the aging of the seal and the necessity of replacing same over time.

In use, the bottom wall 24 is oftentimes referred to as the "front" of the light assembly and the cover 46 is oftentimes referred to as the "rear cover".

The plastic used to mold both the housing 21 and the cover 46 is polypropylene.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A light assembly, comprising:

means defining an elongated housing made of a unitary material, said housing means including first means thereon defining an elongate recess therein, said recess having side wall means and a bottom wall of generally a uniform first wall thickness, said bottom wall having at least one region of a second wall thickness which is less than said first wall thickness so as to render the material of said housing means more transparent to rays of light than said regions of said first wall thickness;

second means defining an opening into said recess on a side of said housing means remote from said bottom wall;

fastener receiving means on said housing means and unitary with said material thereof, said fastener receiving means including plural laterally spaced upstanding and parallel posts on said bottom wall, each having a third means defining fastener receiving openings thereon;

cover receiving means on said housing means encircling said opening into said recess;

cover means for covering said opening into said recess, said cover means having a rim means thereon encircling said cover means adjacent the perimeter thereof and adapted to be received in said cover receiving means to effect a sealing connection of said cover means to said housing means;

an elongated reflector, generally U-shaped in cross section, and mounting means on said cover means for facilitating a mounting of said reflector on said cover means, said U-shape of said reflector opening in a direction facing away from said cover means, said reflector having fourth means defining plural openings therein axially aligned with said posts and receiving said posts therethrough, said cover means including fifth means defining plural openings therethrough axially aligned with said posts and said fastener receiving openings;

light bulb means mounted on said reflector; and fastener means received in said openings in said cover means and operatively coupled in said fastener receiving openings for effecting a securing of said cover means to said housing means, with said reflector and light bulb means being received in said recess, said U-shape of said reflector opening in a direction toward said transparent bottom wall of said housing means with said light bulb means being positioned immediately adjacent said region of said bottom wall whereat said material is at a second wall thickness so that light caused by an illumination of said light bulb means will be caused to pass through said second wall thickness of material.

2. The light assembly according to claim 1, wherein said cover receiving means is a first channel, U-shaped in cross section, and having first and second walls, said U-shaped channel of said first channel opening outwardly in the same direction as said opening into said recess; and wherein said rim means is a second channel, U-shaped in cross section, and having third and fourth walls, said U-shaped channel of said second channel opening in a direction so as to directly oppose said first channel, a wall of each of said first and second U-shaped channel being received in the other of said first and second channels so as to define a labyrinth seal using solely the material of said cover means and said housing means to effect the sealing engagement therebetween.

3. The light assembly according to claim 1, wherein said housing means includes means facilitating a mounting of said housing means to the underside of a vehicle running board.

4. A light assembly, comprising:

means defining an elongated housing made of a unitary material, said housing means having first means thereon defining an elongate recess therein, said recess having side wall means and a bottom wall, said housing means having second means defining an opening into said recess on a side thereof remote from said bottom wall, at least said bottom wall being transparent to rays of light;

fastener receiving means on said housing means and unitary with said material thereof, said fastener receiving means including plural laterally spaced upstanding and parallel posts on said bottom wall, each having a third means defining fastener receiving openings thereon;

cover receiving means on said housing means encircling said opening into said recess;

cover means for covering said opening into said recess, said cover means having a rim means thereon encircling said cover means adjacent the perimeter thereof and adapted to be received in said cover receiving means to effect a sealing connection of said cover means to said housing means;

an elongated reflector, generally U-shaped in cross section and mounting means on said cover means for facilitating a mounting of said reflector on said cover means, said U-shape of said reflector opening in a direction facing away from said cover means, said reflector having fourth means defining plural openings therein axially aligned with said posts and receiving said posts therethrough, said cover means including fifth means defining plural openings therethrough axially aligned with said posts and said fastener receiving openings;

light bulb means mounted on said reflector; and fastener means received in said opening in said cover means and operatively coupled in said fastener receiving openings for effecting a securing of said cover means to said housing means with said reflector and light bulb means being received in said recess, said U-shape of said reflector opening in a direction toward said transparent bottom wall of said recess so that light caused by an illumination of said light bulb means will be caused to pass through said transparent bottom wall.

* * * * *